No. 714,632. Patented Nov. 25, 1902.
J. BEISCH.
BAND CUTTER AND FEEDER.
(Application filed Jan. 31, 1902.)
(No Model.) 2 Sheets—Sheet 1.
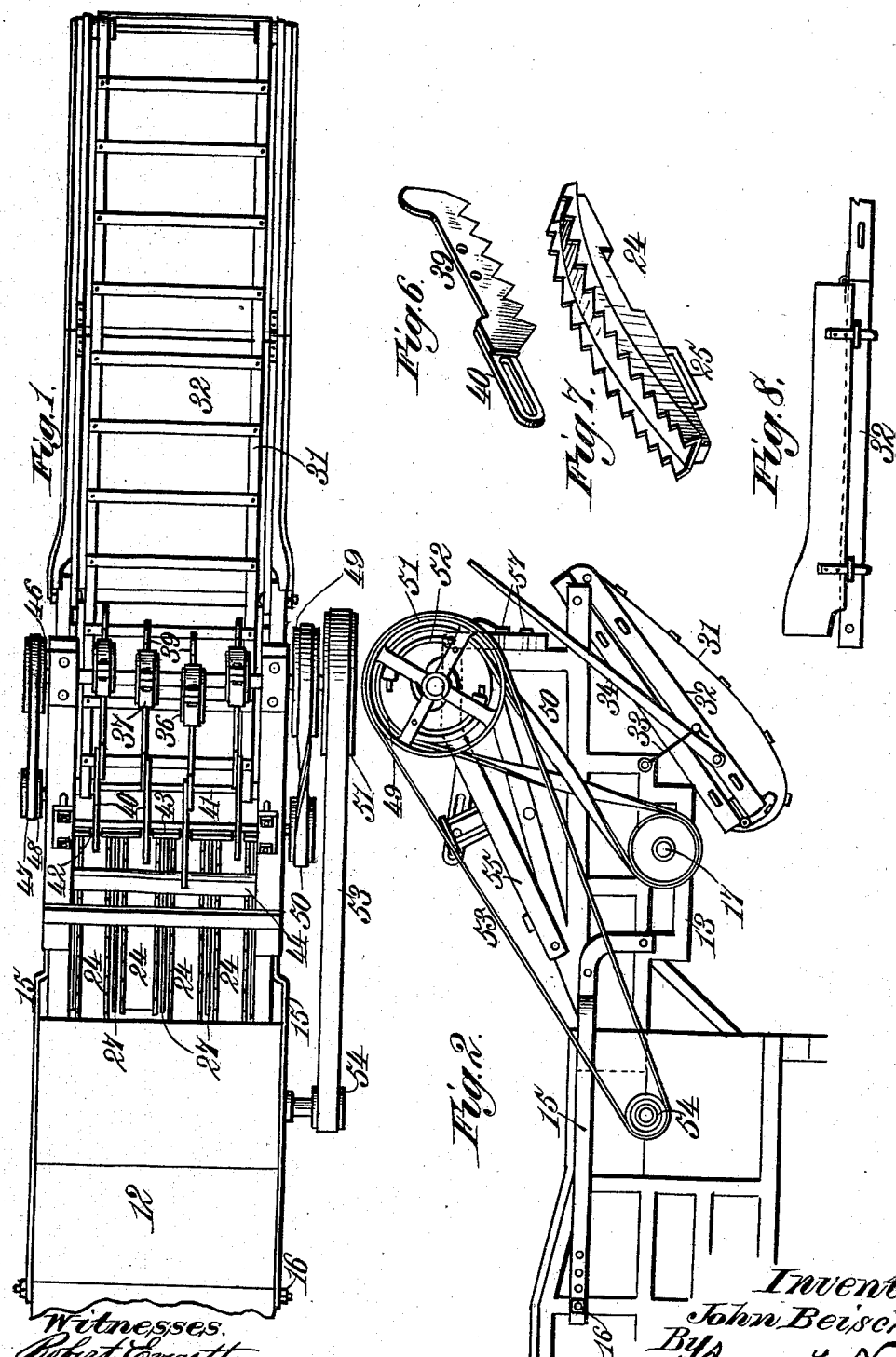

No. 714,632. Patented Nov. 25, 1902.
J. BEISCH.
BAND CUTTER AND FEEDER.
(Application filed Jan. 31, 1902.)
(No Model.) 2 Sheets—Sheet 2.
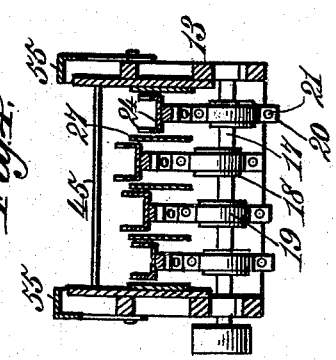
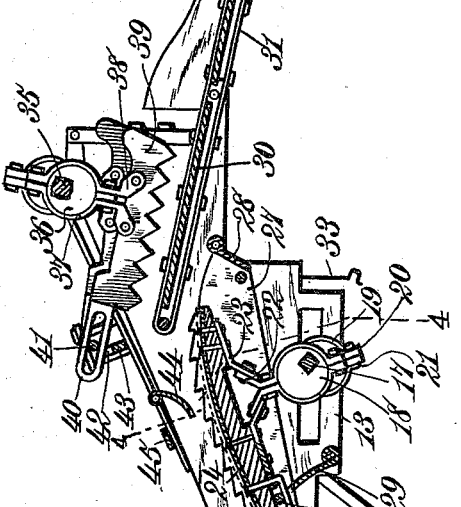
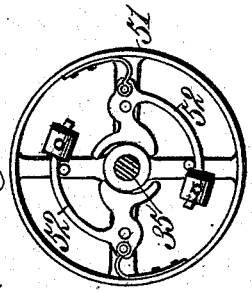
Witnesses.
Robert Everatt.
Bruce D. Elliott.
Inventor.
John Beisch,
By James L. Norris.
Atty.

UNITED STATES PATENT OFFICE.

JOHN BEISCH, OF ADAMS, KANSAS, ASSIGNOR OF ONE-HALF TO WILLIAM C. RICHARDSON, OF ADAMS, KANSAS.

BAND-CUTTER AND FEEDER.

SPECIFICATION forming part of Letters Patent No. 714,632, dated November 25, 1902.

Application filed January 31, 1902. Serial No. 92,032. (No model.)

*To all whom it may concern:*

Be it known that I, JOHN BEISCH, a citizen of the United States, residing at Adams, in the county of Kingman and State of Kansas, have invented new and useful Improvements in Band-Cutters and Feeders, of which the following is a specification.

This invention relates to a band-cutter and feeder for threshing-machines, and the improved apparatus is simple and highly efficient in action.

The objects and advantages of the invention will be set forth in the following description, while the novelty thereof will form the basis of the claims succeeding said description, and I desire at this point to state that the invention is in no wise limited to the exact construction set forth, for changes in details may be adopted within the scope of my claims.

It will be obvious that the parts comprising the mechanism may be made of any suitable material and sizes and relative disposition.

The invention is shown in the accompanying drawings, forming a part of this specification, and in which—

Figure 1 is a plan view of a band-cutter and feeder including my improvements. Fig. 2 is a side elevation of the same. Fig. 3 is a longitudinal section of said band-cutter and feeder. Fig. 4 is a transverse section in the line 4 4, Fig. 5. Fig. 5 is a face view of the governor, while Figs. 6, 7, and 8 are detail views hereinafter described.

Like characters refer to like parts in all the figures of the drawings.

A portion of a threshing-machine is shown at 12, it having the usual concave and toothed cylinder. The band-cutting and feeding mechanism is sustained by a frame 13, its inner end resting upon an extension 14 of the threshing-machine or main frame, and braces, as 15, are fastened to the opposite sides of the auxiliary frame 13 and are connected by bolts, as 16, with the opposite sides of the main frame, the bolts passing through perforations in the inner ends of the braces 15. There is a series of perforations in each brace whereby adjustment of the auxiliary frame relatively to the main frame can be secured. A shaft 17 is supported by the sides of the auxiliary frame near the lower end thereof, the shaft being square for the greater part of its length and the squared portions thereof passing through similar openings in the eccentrics 18, four of which are shown, although this is not essential. The ends of the shaft 17 of course are rounded, so that they can properly rotate in boxes on the auxiliary frame. The eccentrics are embraced by straps 19, provided with offsets 20 to receive the holding-bolts 21. The offsets are situated at diametrically opposite sides of the straps and filling-pieces can be situated between the same, and when the fit between the eccentrics and the straps becomes loose said filling-pieces can be removed to compensate for the wear.

The straps have upwardly-disposed diagonal arms 22, extending forwardly and rearwardly and fastened to the braces or plates 23, which in turn are fastened to the bodies of the reciprocatory feed members 24, which, it will be seen, taper toward their inner ends. The feed members 24 are channeled and the branches thereof are toothed or serrated along their upper edges and feed the grain toward the cylinder of the threshing-machine when said feed members are reciprocated. The feed members have on the under side thereof loops, as 25, through which the transverse guide-shaft 26 is adapted to pass, the same being suitably mounted between the side members of the auxiliary frame 13 and said construction serving as an efficient means for guiding the inner ends of the feed members. Said feed members are separated by longitudinal partitions or walls 27, extending inwardly from the wall 28, which extends entirely across the front or outer end of the auxiliary frame. On the rotation of the shaft 17 the feed members 24 will be reciprocated in alternation, so as to pass the grain toward the threshing mechanism. A door, as 29, is hinged to the transverse shaft 26 and closes the rear end of the threshing compartment or concave, and it is held closed by a suitable latch.

Above the plurality of feed members 24 an inclined platform 30 is located, and the upper end of the feeder 31 passes around the same, the feeder being carried upon a ladder 32, consisting of two parts foldable upon each other when the machine is not in use and adapted to be held in such position by hooks, as 33, located to engage corresponding eyes upon the ladder. The feeder is held in position by props or legs 34, hinged to the opposite sides of the feeder-ladder.

The grain is supplied to the feeder 31, which conducts it to the band-cutting knives under which the inclined platform 30, previously described, is situated. The knives cut the bands of the bundles, and the material is conveyed by the feeder 31 upwardly to its extreme end, from which it drops onto the reciprocatory feed members 24, which conduct it to the threshing mechanism. A shaft, as 35, is supported in suitable boxes at the upper outer corner of the auxiliary frame 13, and it is of a construction similar to the shaft 17, previously described. Said shaft extends through eccentrics 36, and said eccentrics are embraced by straps 37, having depending notched bodies 38, and the blades of the knives or cutters 39 are fitted into the notches of said bodies and suitably held therein. Plates 40 are fastened to the inner ends of the respective knives and are slotted longitudinally thereof, and a shaft 41 extends through the slots of the several plates and is disposed crosswise of the auxiliary frame. The plates 40 extend through notches 42 in a cross-bar 43, the length of which is substantially the same as that of the shaft 41, and said parts 41 and 43 are fixed in place by suitable devices or clamping members carried by the side walls of the auxiliary frame.

The upper eccentric-shaft 36, like the lower eccentric-shaft 17, can be driven at any suitable speed. When the upper shaft is operated, the knives or cutters will be caused to travel back and forth and sever the bands of the bundles presented thereto, and said knives or cutters will be properly guided longitudinally and held against lateral movement by a shaft 41 and across the bar 43, hereinbefore described.

I arrange upon the auxiliary frame a weighted plate 44, pivotally mounted between the side walls thereof and situated at or near the entering ends of the reciprocatory feed members 24. The free end of this weighted plate, which extends entirely across the auxiliary frame interiorly thereof, bears against the advancing grain, so as to prevent the feeding of too great a quantity of the material into the threshing-machine, and to prevent the upward movement of the weighted plate too far a cross-bar 45 is provided, against which the free edge of the plate abuts when the cross-bar reaches the limit of its upward movement. The upper eccentric-shaft 36 carries at what is shown in Fig. 2 as the right end thereof a pulley 46, connected by a band 47 with a pulley 48 upon the upper shaft of the feed belt or apron 31 to thereby drive the latter, and the speed of the feed belt or apron can be varied by changing the size of the pulley 46, the latter being removably mounted for this purpose. The said upper or eccentric shaft carries at its left end a pulley 49, connected by the cross-belt 50 with the lower eccentric-shaft 17, whereby the reciprocatory feed members can be actuated. The said shaft 35 also carries a pulley or wheel 51, adapted to be connected by a speed-governor 52 with said shaft, the speed-governor serving to regulate the velocity of said pulley or wheel 51. A straight belt 53 connects this pulley 51 with a pulley or wheel 54 on the shaft of the cylinder. The auxiliary frame consists of two sections, the upper one (denoted by 55) being hinged to the lower one and having along its forward edge slots to receive bolts 57, connected with the lower section, and by loosening which the upper section of the frame, which carries the band-cutting mechanism, can be raised or lowered for the purpose of adjusting, should this be necessary.

Having described my invention, what I claim is—

1. In a band-cutter and feeder, a plurality of reciprocatory feed members and mechanism for actuating the same, band-cutting mechanism, a feeder arranged to deliver the bundles of grain to said reciprocatory feed members, longitudinal partitions separating said feed members, and a transverse wall connected to the partitions and also to the side walls of the frame.

2. In a band-cutter and feeder, a plurality of reciprocatory feed members and mechanism for actuating the same, loops fastened to the under sides of said feed members and a shaft supported between the side walls of the frame and extending through said loops, band-cutting mechanism and a feeder arranged to deliver the bundles of grain to said reciprocatory feed members, longitudinal partitions separating said feed members, and a transverse wall connected to the partitions and also to the side walls of the frame.

In testimony whereof I have hereunto set my hand in presence of two subscribing witnesses.

JOHN BEISCH.

Witnesses:
J. M. REYNOLDS,
W. C. RICHARDSON.